US008027444B1

(12) United States Patent
Martin et al.

(10) Patent No.: US 8,027,444 B1
(45) Date of Patent: Sep. 27, 2011

(54) RINGBACK TONES MANAGEMENT FOR PHONES HAVING A PROFILE SPECIFYING BOTH ORGANIZATIONAL AND PERSONAL RINGBACK TONES

(75) Inventors: Geoff S. Martin, Overland Park, KS (US); Jay S. Harmon, Overland Park, KS (US); Jonathan R. Kindred, Gardner, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1276 days.

(21) Appl. No.: 11/700,656

(22) Filed: Jan. 30, 2007

(51) Int. Cl.
*H04M 3/42* (2006.01)
(52) U.S. Cl. .................. 379/201.01; 455/414.1
(58) Field of Classification Search ............. 379/201.01, 379/221.08–221.11; 455/414.1
See application file for complete search history.

(56) References Cited

U.S. PATENT DOCUMENTS

| | | | | |
|---|---|---|---|---|
| 6,731,738 B1 | 5/2004 | Qiu et al. | | 379/219 |
| 7,050,564 B1 | 5/2006 | Boldt | | 379/257 |
| 7,184,532 B2 | 2/2007 | Creamer et al. | | 379/207.08 |
| 2004/0114732 A1 | 6/2004 | Choe et al. | | 379/88.17 |
| 2005/0105706 A1* | 5/2005 | Kokkinen | | 379/201.01 |
| 2006/0098801 A1 | 5/2006 | Hahm et al. | | 379/257 |
| 2006/0109970 A1 | 5/2006 | Shim et al. | | 379/207.16 |
| 2006/0135158 A1 | 6/2006 | Lee et al. | | 455/435.1 |
| 2006/0147021 A1* | 7/2006 | Batni et al. | | 379/221.08 |
| 2006/0291639 A1* | 12/2006 | Radziewicz et al. | | 379/211.01 |
| 2007/0003040 A1* | 1/2007 | Radziewicz et al. | | 379/211.01 |
| 2007/0116253 A1* | 5/2007 | Batni et al. | | 379/399.01 |
| 2007/0133760 A1* | 6/2007 | Cotignola et al. | | 379/88.13 |
| 2008/0002824 A1* | 1/2008 | No et al. | | 379/418 |

\* cited by examiner

*Primary Examiner* — Davetta Goins
*Assistant Examiner* — Mohammad Islam

(57) ABSTRACT

A call tones management platform provides a facility for configuration of a user profile. The user profile specifies the circumstances under which organizational call tones (such as a call tone of an employer of the subscriber using the phone) or a personal, non-organizational tone should be rendered to a calling party. When a call is placed to the subscriber, the profile is consulted and an instruction for rendering a call tone in accordance with the profile is sent to a call tones content provider or run time site generating call tones during the time of a call. The call tones management platform implements logic for resolving potential scheduling conflicts between organizational call tones and private call tones, such as, for example, a rule in which the organizational call tone trumps personal call tones for calls are made to the subscriber telephone during business hours.

12 Claims, 3 Drawing Sheets

RINGBACK TONES MANAGEMENT FOR PHONES HAVING A PROFILE SPECIFYING BOTH ORGANIZATIONAL AND PERSONAL RINGBACK TONES

BACKGROUND

A. Field

The invention relates to providing "ringback" media, e.g., tones, music, speech or other media, to a caller's phone. Ringback is the ringing or other sound that a caller hears while waiting for the called party to answer the phone. In one aspect, the invention relates to systems and methods for managing play of ringback media for a caller when the called party has not only their own personal selection of ringback media but also has been assigned ringback tones by an organization they are affiliated with, such as their employer.

B. Related Art

In traditional phone systems, a switch in telephone network plays a ringback tone in the form of call tones to the calling party. The switch may be at the caller's end of the call or at the called party's end of the call. The provision of call tones to a calling party is sometimes referred to in the art as "call tones service."

In this respect, call tones service is different from some other services, such as customized ringers, screensavers, games and applications etc. In these other types of services, the end device (typically a mobile device which includes telephone functionality) downloads a specific type of media/information, and then runs it from the end device. For example, for ringers, the mobile device downloads the particular ringer media from a network based server, and then the user assigns it to callers or call types.

Call tones service, as noted above, is usually network-based. That is, call tones media is played from a network device (typically, a call tones server) not the end device. The call tones are packetized from a call tones server and transmitted over a communications network to the end device calling party. (Call tones are packetized if Voice over Internet Protocol (VoIP) technology is involved. Currently most call tones systems are TDM-based. In a non-VoIP scenario, the call tones would be transmitted the same way as traditional TDM voice signals). In some instances, the call tones server is operated by the third party provider of the call tones content. Regardless of whether the call tones server is operated by a wireless service provider or a third party content provider, downloading of call tones to the end device is unnecessary. However, it does introduce some special complexities. Such complexities can be due to the fact that call tones media may be provided by multiple independent call tones content providers. In other words, the source of the call tones may be a third party which is independent from the carrier providing telephone services (e.g., Sprint Nextel).

In a current method of operation, the call tones systems usually have a content management interface or platform from where call tones contents are either manually or automatically provisioned, i.e., browsed by a subscriber and then purchased and assigned to particular callers. The call tones are supplied by a particular content provider that has contracted with the call tones service provider. Alternatively, the call tones service provider may choose to perform the content management function itself. Under this method, the call tones users usually access a call tones catalog on-line and make purchases of call tones content via an interactive interfaces provided by the call tones system. Such interface may take the form of a web interface, interactive voice response unit (IVR), or via short message service (SMS) or wireless application protocol (WAP) messaging.

SUMMARY

The following embodiments and aspects thereof are described and illustrated in conjunction with systems, tools and methods which are meant to be exemplary and illustrative, not limiting in scope. In various embodiments one or more of the above-described problems have been reduced or eliminated, while other embodiments are directed to other improvements.

It will also be noted that the disclosed inventions can be implemented in a variety of telecommunications architectures and the invention is not architecture-specific. For example, they can be implemented in conventional cellular telephone systems, as well as in Voice over IP, Voice over WiFi, and Voice over WiMax systems. In these three later systems, a voice network includes an application server which provides call processing intelligence, such as switching and digit analysis, and in such a system a mobile switching center (such as found in conventional cellular communications systems) may not be used. Furthermore, many of the functions performed by the various entities can be provided in software, hardware, or in a combination thereof. Thus, in the following summary and detailed description, the particular details of the disclosed embodiments are offered by way of illustration and not limitation.

In a first aspect, a method is disclosed of rendering ringback media to a calling party when the calling party calls a wireless telephone. The method includes a step of maintaining a profile for the wireless telephone which identifies (a) circumstances in which an organizational ringback media is to be played to the calling party and (b) circumstances in which either a non-organizational ringback media or no ringback media is to be played to the calling party. The method further includes the step of rendering ringback media to the calling party in accordance with the profile.

In one embodiment, the method further comprises the step of transmitting data from the profile (such as for example identification of a particular call tones from the profile) to a call tones content provider, such as for example a third party call tones content provider which generates call tones media for transmission to the calling party. Such call tones content provider can be managed by a third party (i.e., external from a wireless service provider managing the call tones content platform). The call tones content provider generates ringback media for transmission to the calling party in accordance with the profile.

In one possible variation, the profile includes (1) data identifying a first time period during which organizational ringback media is to be played to the calling party (such as between 9:00 am and 5:00 pm, when a call tone file "X" is to be rendered which is a sales message of the corporate employer of the subscriber) and (2) data identifying a second time period in which non-organizational (personal) ringback media is to be played to the calling party (such as the period between 5:00 pm and 9:00 am, when subscriber-specified call tones pattern "Y" is to be rendered). The method further comprises the step of instructing a call tones content provider as to ringback media to generate for transmission to the calling party in accordance with the profile. In a variation, the method includes a step of transmitting at least a portion of the profile for the wireless telephone to a call tones content provider (such as for example the schedule portion and the identification of call tones to be rendered at different times of the day). The call tones content provider generates ringback media in accordance with the profile.

In one variation, the profile is maintained by a provider of wireless communications services and is managed in a call tones management platform. The call tones management platform is accessible to an organizational ringback media administrator over a computer network such as the Internet. The administrator can remotely configure the profile to define circumstances in which corporate or other organizational ringback media is to be played to a calling party to a particular subscriber/member of the organization.

In still another aspect, a method of facilitating rendering of both organizational and non-organizational ringback media to callers of a wireless telephone is provided. The method includes a step of providing a first interface to a call tone management platform whereby an organization's call tones administrator may remotely configure a profile for a wireless telephone to identify circumstances in which an organizational ringback media is to be rendered to a caller to the wireless telephone. In a scenario where the organization is a corporation, the wireless telephone is assigned to a user which is affiliated with the corporation, such as an employee of the corporation. The method further includes providing a second interface to the call tone management platform, such as a interactive voice response interface, Web interface, WAP interface or other, whereby the user may remotely configure the profile to identify circumstances in which a non-corporate ringback media is to be rendered to a caller to the wireless telephone. For example, the call tones management platform may include a Web interface whereby the user can access their profile and assign a particular call tone to be played to all callers between the hours of 5:00 pm and 10:00 pm. The method further includes the step of providing logic executable in a computing platform with access to the profile for resolving conflicts, if any, between the circumstances identified by the administrator and circumstances identified by the user. For example, suppose that the user accesses their profile and specifies that call tones media file "Y" is to be played to all callers at any time, seven days a week, but a corporate call tones administrator assigned corporate call tones "X" to be played to all callers during business hours on weekdays. The logic resolves such conflicts so that a call tones server responsible for generating call tones at the time of a call is not faced with conflicting instructions. The logic could resolve such conflict in a variety of ways. For example may be programmed to resolve conflicts in favor of the call tones administrator. That is, in this example if a caller calls the telephone during business hours the profile is constructed such that the corporate call tone media "X" is to be rendered and at all other times the user-specified call tones media "Y is to be rendered. Alternatively, the logic could specify that during business hours call tones media "X" is to be rendered to certain callers while call tones media "Y" is to be rendered to other callers during business hours.

In one embodiment, the administrator interface takes the form of an application (software instructions) which generates a graphical user interface for interaction by the organization's call tones administrator. The application further provides a facility by which the administrator can configure corporate call tones to be rendered to wireless phones of users affiliated with the organization. The application further provides a facility such as a transmit function by which configurations specified by the administrator are sent to the content management platform for loading into the user profile database.

As one example, the graphical user interface includes a feature by which the administrator may set a time during which an organization-specific call tone is to be rendered to a caller. As another example, the graphical user interface includes a feature by which the administrator may select an organization-specific ringback media file to be rendered to a caller. As yet another example, the administrator may select a plurality of wireless telephones each associated with a different user affiliated with the organization (such as select all the phones for some defined subset of employees such as "sales staff") and interactively identify the circumstances in which an organizational ringback media is to be rendered to a caller to a sales staff member's wireless telephone. For example, the administrator could configure the organizational call tones such that a corporate ringback tone particularly suitable for corporate sales, such as a corporate sales pitch, is rendered to all callers to the corporate sales staff during business hours during the week. The application generates data reflecting such configurations set by the administrator and uploads such data to the call tones management platform for loading into the profiles.

In still another aspect, a method of facilitating rendering of both organizational and non-organizational ringback media to callers of a wireless telephone is provided. The method includes a step of providing an application generating a graphical user interface for interaction by a call tones administrator of an organization. The application includes user interface features by which the administrator may identify circumstances in which an organizational-specific ringback media file is to be rendered to a caller to a wireless telephone. The wireless telephone is assigned to a user affiliated with the organization, such as an employee or officer. The method further includes a step of uploading data representing the identified circumstances to a call tones management platform and storing the data in a profile for the wireless telephone. The method further includes a step of providing an interface to the call tone management platform whereby the user may remotely configure the profile to identify circumstances in which a non-organizational ringback media is to be rendered to a caller to the wireless telephone.

In one variation, the call tones management platform includes a computing platform executing machine readable instructions. The instructions comprise logic which operates to resolve conflicts which may arise between the circumstances identified by the user and the circumstances identified by the administrator. In one form, an error message is generated and presented on the interface to the user when they attempt to define a circumstance for rendering a call tone which is in conflict with a circumstance previously specified by the administrator. In another variation the logic is constructed such that the conflict is resolved in favor of the circumstances identified by the administrator. Resolution in favor of the administrator may be suitable when the organization pays the bill for the monthly usage of phone, for example. In still another variation, the logic operates such that in the event that data is uploaded from the administration application which is in conflict with circumstances previously identified by the user in the profile, the conflict is resolved in favor of the circumstances identified by the administrator.

These and still other aspects of the invention will be more fully explained in the following detailed description and with reference to the drawings.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION OF PREFERRED EMBODIMENTS

Overview and Configuration of a User Profile for Call Tones

Figure 1:
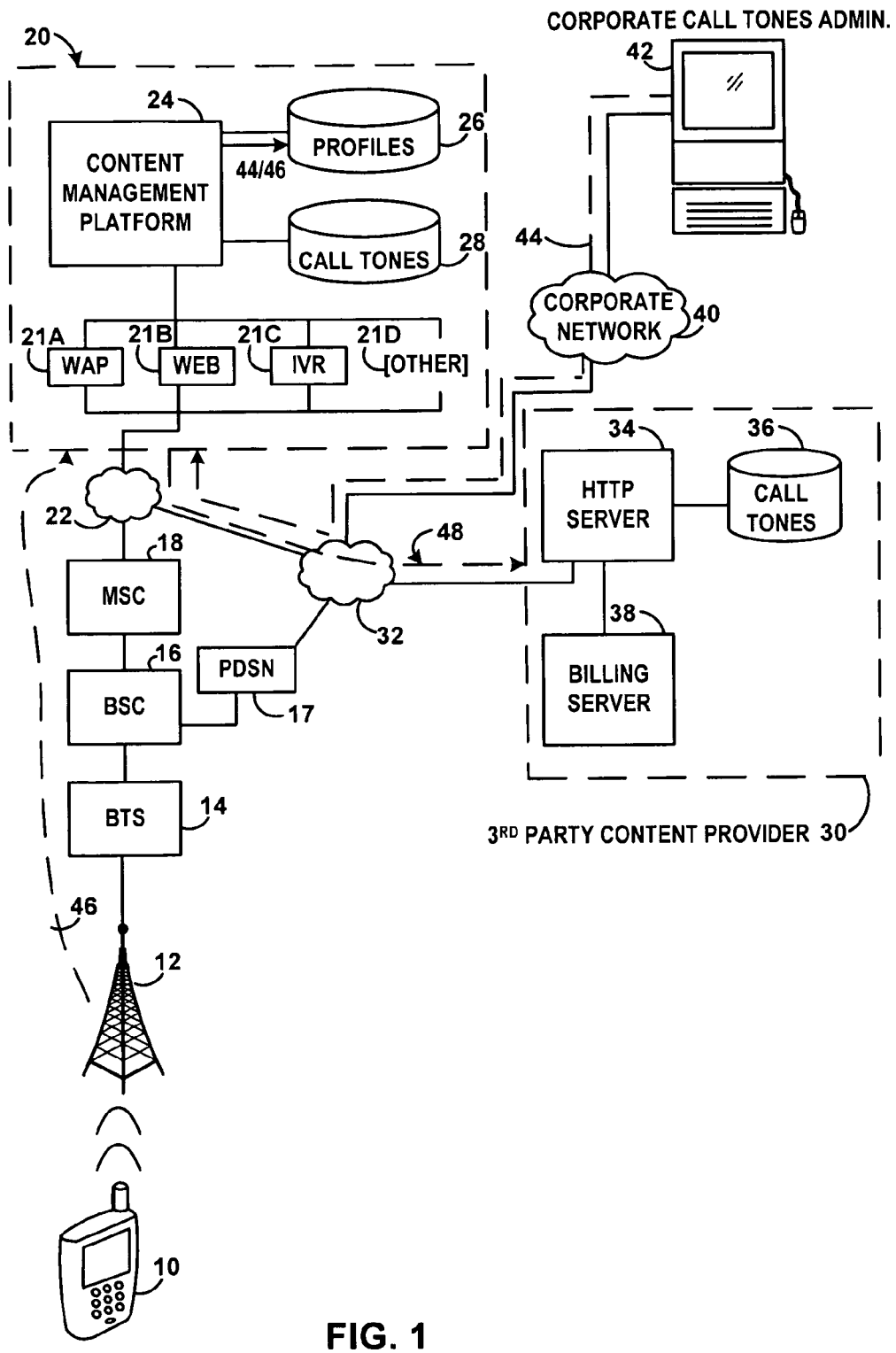
FIG. 1 is a block diagram of a system for managing the rendering of ringback media to a caller, with the ringback selections made by both the subscriber and by an organization the subscriber is affiliated with, such as their employer.

FIG. 1 is a block diagram of a call tones system 20 and related infrastructure facilitating a subscriber wireless phone 10 to make purchases of call tones for their private use, and also facilitating an organization such as a corporation or other employer of the subscriber to establish organization-related call tones for the subscriber phone 10. In FIG. 1, either organizational or non-organizational (personal) call tones are rendered to callers calling the subscriber 10, depending on a user profile for the user of the phone 10. In the illustrated embodiment, the call tones are rendered (generated) from a call tones content provider 30. The content provider 30 may be independent of the entity, such as Sprint, AT&T, or Verizon, providing wireless service for the phone 10.

The thrust of this disclosure is directed to methods by which the call tones system 20 manages both the private call tones of the phone 10 as well as organization call tones for the phone 10. The methods insure that the content provider 30 renders call tones media content to callers calling the phone 10 that is content with both the personal call tones selections of the subscriber using the phone 10 and also organization call tones set up by an administrator, e.g., an call tones administrator of the subscriber's employer.

It will be appreciated that the principles of this disclosure are also applicable to the situation where the call tones content is rendered by the provider of wireless communication services and not a separate third party content provider 30. Further, while the present example will be given where "corporate" call tones are established for the subscriber phone 10 by virtue of an employee-employer relationship between the subscriber using the phone 10 and the corporation, the status of the organization as a "corporation" is of course not essential and the word "corporation" is merely selected here for ease of description. The employer could be some other type of organization, such as non-profit organization, governmental agency, partnership, sole proprietorship, etc.

Additionally, in the following description the phone 10 will be referred to as the phone of the subscriber. In some embodiments, the phone 10, and a service plan for using the phone 10, may paid for by the organization. This difference is not particularly important, In the situation where the service for the phone 10 is paid for by the employer the phone 10 will still be referred to as a "subscriber phone" because the phone itself is operated by a subscriber of a particular wireless service provider that provides, either directly or indirectly, call tones service. It matters not whether the service provider records show the phone 10 and service plan as being paid by the actual person using the phone or the person's employer.

Only one call tones content provider 30 is shown in FIG. 1, it being understood that the principles of operation shown and explained in FIG. 1 operate in like fashion in a system in which there are multiple different content providers.

The telephone 10 may take the form of a cellular telephone, personal digital assistant, palm computer, land line phone, Voice over IP phone, or any other kind of terminal or other equivalent device with telephone functionality. The present discussion will refer to the phone 10 as one which is used by a subscriber of wireless telephone services, such services provided by a wireless service provider which manages a call tones system 20.

The illustrated phone 10 therefore includes an antenna and processing circuitry for engaging in RF communications with a wireless telecommunications network infrastructure. The infrastructure includes an antenna 12, base transceiver station 14, base station controller 16 and a mobile switching center (MSC) 18. These details are conventional and known in the art, e.g., in IS-41 wireless networks. The MSC 18 is connected to a wireless service provider network 22, which may take the form of a wide area packet-switched network. The network infrastructure may also include a packet data serving node (PDSN) 17 which provides connectivity from the wireless device 10 to a packet switched network such as the Internet 32.

The call tones system 20 is essentially a "back end" centralized data center system and associated profile and call tones databases, and functions to provide for billing, provisioning, content management and customer Web/WAP access to their call tones profiles. During a call, the call tones can be generated and served from separate run time sites (see FIG. 2, run time site 70) or from the third party content provider 30.

The call tones system 20 includes a call tones content management platform 24, a profiles database 26 and a call tones database 28. The call tones management platform 24 may take the form of a general purpose computing platform which is connected to the wireless service provider enterprise network 22. The function of the platform 24 is to manage access to the user profiles 26 and coordinate rendering of call tones to callers of subscriber phones, as described herein. The call tones system 20 includes an interface to allow the use of the phone 10 to access the content management platform 24. The interface may take the form of a WAP interface 21A, a Web interface 21B, an interactive voice response (IVR) platform 21C, or other form of interface 21D.

The content management platform 24 is programmed with instructions for communicating with the device 10 as described herein to allow the device to update the call tones profile for the user in a profiles database 26, for example when the user of the device 10 purchases a new call tone or wishes to change how the call tones are assigned to particular callers (calling parties). This action is indicated by the arrow 46 in FIG. 1. The profiles database 26 is a database which profile information for the phone 10, such as which call tones to play at particular times of day or to particular callers. The user profile 26 also includes assignment of corporate call tones for callers of the phone 10, as will be explained below.

The call tones database 28 is a database containing call tones media files. In an alternative configuration, the database 28 stores information identifying particular call tones (such as ID numbers or names for them), but does not store the actual media files. In the event that the user of the device 10 purchases a call tone that is not currently stored in the database 28, the call tones service platform obtains the call tone media file directly from the third party content provider 30.

The service provider enterprise network 22 is coupled via one or more intermediate networks 32 to the third party content provider 30. The network 32 may be the Internet, for example, or a virtual private network. The third party content provider 30 has a presence on the Internet, by means of an HTTP web server 34 which serves web pages describing call tones content which are available for purchase. The content provider 30 may include a call tones database 36 storing content media files. The provider 30 may also include a billing server 38 for storing purchase transaction information. Such purchase transaction information may be furnished to a billing server (not shown) of the wireless service provider for purposes of billing content that is purchased to the subscriber. The content provider 30 further includes a call tones server (not shown) generating and transmitting call tones to an MSC for rendering to a calling party in response to instructions from the call tones management platform 24, such instructions indicated by the arrow 48 in FIG. 1.

One mechanism by which the user of the device 10 can purchase call tones will now be described. The user launches the web browser on the device 20, acquires Web connectivity using the wireless network infrastructure 12, 14, 16, 18, and navigates to the home page of the call tones content provider 30. The phone 10 initiates web page request pertaining to call tones content and such pages are served by the server 34. The user of the phone browses the content and makes a selection and purchase. The manner in which the call tones content is browsed and purchased is not particularly important. The purchase transaction is logged by the billing server 38 and reports of call tones content purchases are furnished to the wireless service provider, e.g., to the profiles database 26 or to a separate billing system managed by the wireless service provider. Alternatively, such billing could be by credit card, by deduction in value from a calling card, or by any other means. The subscriber profile in the profiles database 26 is augmented to reflect any new call tones purchased and other information relating to how the content is to be rendered, such as for example assigning particular call tones to particular callers or assigning certain call tones to particular times of day.

The pending U.S. patent application of Baoquan Zhang, et al., Ser. No. 11/591,195 filed Oct. 31, 2006, contains additional information about how call tones content can be purchased and the purchase transactions synchronized with the call tones system 20, and the reader is directed to this application for further details.

Additionally, an internal synchronization takes place between the call tones database 28 and remotely located run-time sites where call tones may be played during calls, particularly in the situation where the wireless service provider renders call tones content to a calling party. The run time sites 70 (FIG. 2) are for real time call handing and tone play purposes. In this synchronization step, call tones data at the call tones service platform database 28 and a call tones database (not shown) at the run time site 70 are synchronized. The synchronization is needed in order to make sure that the call tones are played to calling parties in accordance with the profile as soon as possible after the profile is updated in the database 26.

Consider now the situation where the wireless phone 10 is used by a person who is affiliated, e.g., employed, by an organization such as corporation. The corporation and employee may have an arrangement whereby when a person calls the phone 10 during business hours (or any other time which may be agreed upon), the calling party hears a corporate-related ringback tone, instead a personal or private ringback tone which was selected by the user of the phone 10 as explained above. An example where a corporate ringback tone may be appropriate is where, say, the corporation or other organization employs the user of the phone 10, purchased the phone 10 and pays for phone service, and the phone is used as part of the day-to-day work of the user. In this situation, the corporation may wish for callers to hear a particular corporate related message when a caller calls the employee/user, such as for example a sales message, a message providing corporate news or other information, or any other appropriate message.

In the example of FIG. 1, the corporation includes a workstation 42 which is used by a corporate call tones administrator which is used to establish the parameters under which ringback tones are to be played to corporate employee phones. The uploading of corporate call tones parameters for one or more employee phones to the profiles database 26 is indicated by the arrow 4 in FIG. 1. For example, a software application may be resident on the workstation 42 which provides an interface by which the administrator can gain access to the call tones management platform 24 and change the profiles 26. The interface can be represented as a graphical user interface which provides tools and features which allow the administrator to assign particular corporate ringback tones to corporate-related phones either on an individual basis, on the basis of groups of phones, or for all corporate phones. As another example, the application can be resident on the workstation 42 which allows the administrator to make settings for ringback tones, and then periodically uploads data representing such settings to the content management platform 24 via the networks 40, 32, and 22.

Figures 3, 4:
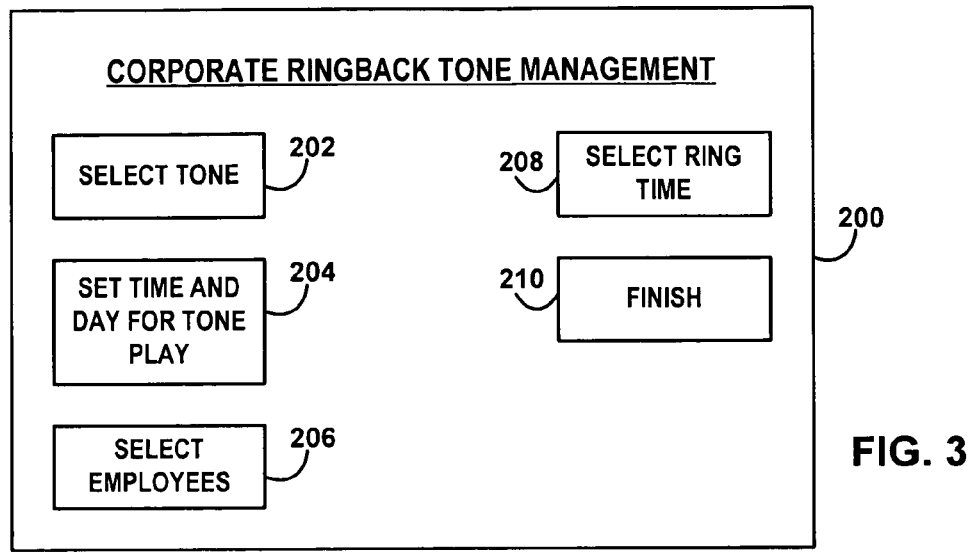
FIG. 3 is a simplified illustration showing an example of one possible call tones management interface which is used by the administrator workstation of FIG. 1 to establish call tones settings for persons affiliated with the organization, such as the corporation's employees.
FIG. 4 is an illustration of a portion of the user profile database of FIG. 1, including settings for rendering corporate call tones established by the administrator using the interface of FIG. 3. Information from the profiles of FIG. 4 is periodically synched with the third party call tones content providers of FIG. 1, or alternatively forwarded to the call tone content provider at the time of a call, to ensure that call tones are rendered in accordance with profile.

An example of how the interface application might present tools and other features for selection and assignment of corporate ringback tones is shown in FIG. 3. The application displays one or more screens 200 on the workstation, which includes separate fields, icons or toolbars or other features 202, 204, 206, 208. The feature 202 allows the administrator to select a particular corporate ringback tone from a list of tones. When the feature 202 is activated, a drop-down list of available corporate tones are displayed, the administrator can preview them, and make a selection of one to assign to one or more phones. When the feature 204 is selected, the administrator is provided with a date and date selection mechanism, by which the administrator can select a time of day and day(s) of the week during which the tone selected from feature 202 is to be rendered to callers of the phone. When the feature 206 is selected, the administrator is provided with drop down list of individual employees, or for large corporations groups of employees. The administrator makes a selection of one or more employees or groups of employees for purposes of assignment of call tones. When the feature 208 is selected, the administrator is provided with a menu or other feature which allows the administrator to select the duration of the ringing period, in order to provide sufficient time for the corporate ringback tone to be played even in the event that the employee answers the phone right after the phone starts to ring. The ring time selection feature 208 may be included as part of the select tone feature 202. When the administrator is done with the selection, they click on the finish icon 210. At this point data representing the configuration parameters they have just assigned is uploaded to the content management platform 24 and the settings are added to the user profile database 26 of FIG. 1.

The user interface features of FIG. 3 are intended to represent just one possible way in which an interface application can be provided to a corporate ringback media administrator. Wide variation from the specifics of FIG. 3 is possible without departure from the scope of the invention.

Consider now FIG. 4, which depicts a portion of the user profile database 26 and in particular three user profiles 302A, 302B, and 303C. Profile 302A includes an entry 304 indicating the mobile directory number of a wireless phone. Field 306 contains times of a day. Field 308 indicates the name or other identifier of a ringback media file which is to be played for the times of day in field 306. Field 312 indicates day of the week limitations for the tones of column 308 and times of day 306. Field 310 contains other elements of the user profile 300, such as for example, identification of particular ringback tones to be played to particular calling parties, account information, or other information, which is not pertinent to the present discussion.

In the example of FIG. 4, the phone with number 360 378 4514 has a personal (non-corporate) ringback tone (with ID "RBT1") assigned to the periods 0000-0900 (midnight to 9:00 am), a corporate ringback tone (with ID "CRBT1") for the period between 0900 and 1700 (9:00 am to 5:00 pm), and private ringback tone RBT1 for the period between 5:00 pm and midnight. RBT1 is typically entered into the profile 302A as a result of the user of the phone interacting with the call tones management platform 24, e.g., using the IVR or web interfaces of FIG. 1, whereas the corporate ringback tone C1RBT1 assigned to period 0900-1700 was the result of the corporate ringback tone administrator configuring the profile using the interface of FIG. 3 and uploading of corporate ringback tone configuration parameters to the platform as described above.

To prevent conflict between the private assignment of ringback tones and the corporate ringback tones, the platform includes logic which resolves such conflicts in accordance with one or more rules. The logic could take a variety of forms. In one form, the platform 24 presents an error message to the user when they use one of the interfaces 21 (FIG. 1) to change their profile in a manner which conflicts with previously configured parameters from the administrator. For example, if the administrator tells the platform 24 to have ringback tone C1RBT2 (a sales message) played during business hours Monday-Friday and the user of the phone 10 attempts to purchase a new ringback tone and have it applied generally to all callers every day of the week, the platform 24 generates an error message. One example of the error message could be "Sorry, your assignment of your new ringback tone conflicts with the ringback tones from your employer. Your employer has assigned corporate ringback tone for the period 9:00 to 5:00. Would you like to have your new ringback tone applied to callers outside of this period?"

As another example, the logic in the call tones platform 24 resolves conflicts in favor of the call tones administrator, without generating error messages. For example, when the assignment of call tones is received from the call tones administrator, to the extent that such assignments are inconsistent with previous information in the user profile database 26 the user profile is changed to take into effect the assignments of the administrator. That is, in this example if a caller calls the telephone 10 during business hours the profile is constructed such that the corporate call tone media "C1RBT2" is to be rendered and at all other times the user-specified call tones media "RBT2" is to be rendered.

Note in FIG. 4 that the profile 302C, the phone 360-378-4512 does not have any private ringback tones assigned. Only a corporate ringback tone is indicated for the M-F time slot of 0900-1700. If the user of this phone were to later attempt to purchase a call tone and have it assigned generally to all callers, then either an error message is rendered to the user or else the conflict-resolution logic is implemented to resolve the conflict for the 0900-1700 time slot on weekdays.

Rendering of Call Tones Content

Figure 2:
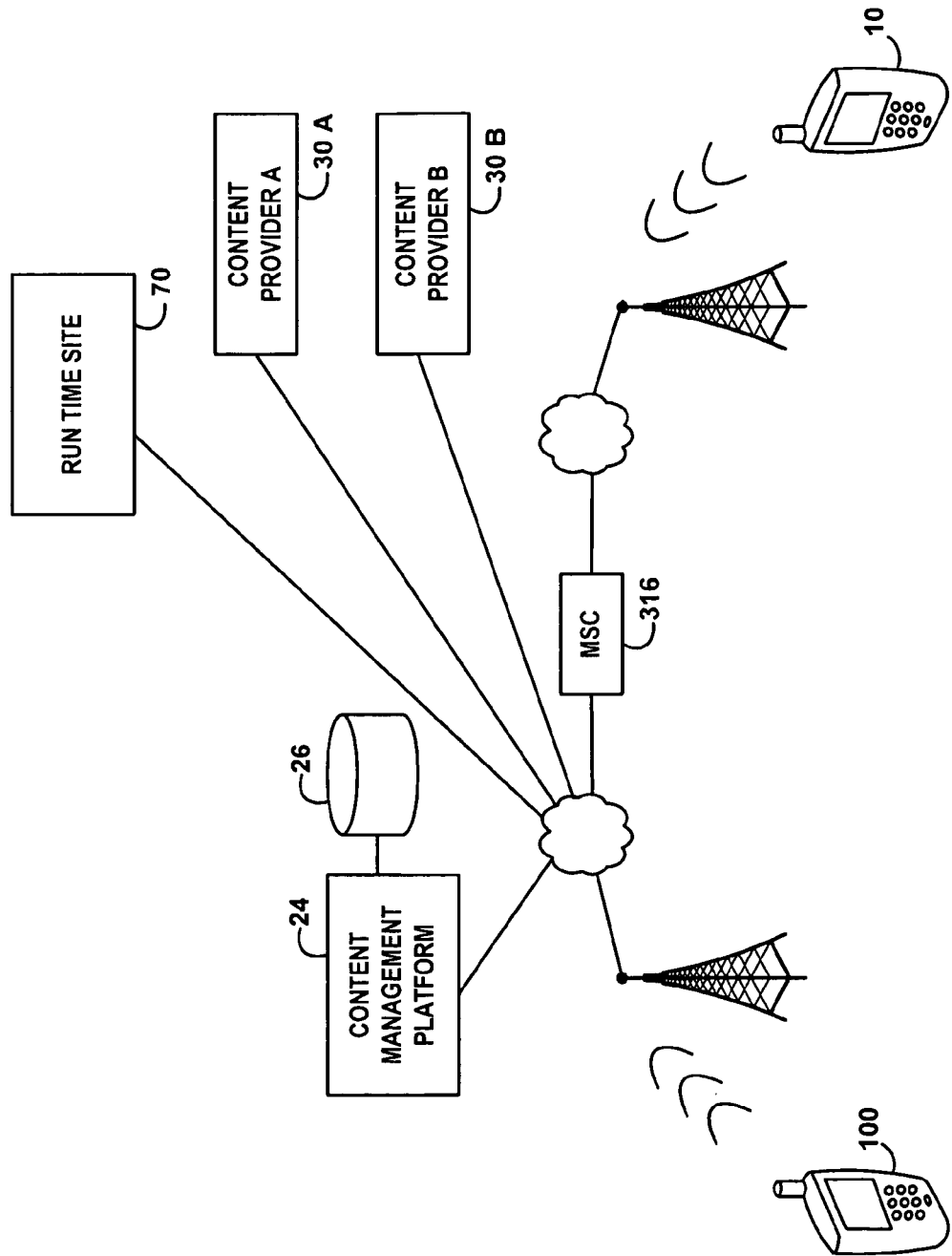
FIG. 2 is an illustration showing the elements involved in rendering call tone to a caller who calls the telephone of FIG. 1.

An example of how the user profile 26 can be used render call tones media content will now be described with reference to FIGS. 2 and 4. In FIG. 2, a caller 100 places a call to the phone 10. Suppose phone 10 is the phone with phone number 360-378-4514 with the profile shown as 302B in FIG. 4. The phone 100 is shown as a wireless phone in the example of FIG. 2 but could be a land-based phone.

The phone 100 established a connection with a base station antenna and the call is routed over cellular telephone network infrastructure to a mobile switching center (MSC) 316. The MSC 316 responds to trigger messages in accordance with IS-41, one of which indicates that call tones are applicable to calls placed to phone 10. The MSC signals to the content management platform 24 that a call is being placed to phone 10. The platform 24 views the profile 302A in the profile database 26, determines the time and day, and then sends an instruction message (indicated at 48 in FIG. 1) to a third party content provider 30A or 30B to generate call tones content in accordance with the profile. The content provider 30A or 30B generates and sends the call tones content to the MSC 316 for transmission to the phone 100. Alternatively, the platform 24 could send the profile for the phone 10 (or a portion thereof such as the information in fields 304, 306, 308 and 312) to the content provider 30A or 30B and the content provider 30A determines which call tones to render depending on the information in the profile 302B. The content provider 30A generates the call tones content and transmits it to the MSC 316. The MSC forwards it to the phone 100. When the phone 10 goes off hook, provided that the ring time has been met or exceeded, the call tones ceases and the call proceeds in the normal fashion.

In one variation, a synchronization takes place between the call tones system 20 and the third party content providers 30A, 30B. Basically, this synchronization occurs in order to make sure that the call tones are rendered to calling parties in accordance with the profile as soon as possible after the profile is updated in the database 26 or new corporate ringback tones are created. In another variation, when call tones are rendered by a run-time site 70, a synchronization step is performed between the information in the profile and the call tones media files stored locally in the run-time site. For example, if the corporation wished to change its ringback tone for the 0900-1700 time slot for all of its employee phones from C1RBT1 to C1RBT2, the information in the profile database 26 is changed for all employee phone numbers and the run time sites and or/third party content providers are provided with the new media file containing the new ringback tone C1RBT2.

From the above it will be appreciated that we have thus described a method of rendering ringback media to a calling party 100 when the calling party 100 calls a wireless telephone 10 includes a step of maintaining a profile 26 for the wireless telephone 10 which identifies (a) circumstances in which a corporate ringback media is to be played to the calling party (FIG. 4, information in profiles 302A, 302B, 302C) and (b) circumstances in which either a non-corporate ringback media or no ringback media is to be played to the calling party (FIG. 4, information in profiles 302A, 302B and 302C). The method further includes the step of rendering ringback media to the calling party in accordance with the profile, as explained above.

In one embodiment, the method further comprises the step of transmitting data from the profile 26 (such as for example identification of a particular call tones from the profile) to a call tones content provider 30A, such as for example a third party call tones content provider 30A or 30B (FIG. 2) which generates call tones media for transmission to the calling party 100. Such call tones content provider can be managed by a third party (i.e., external from a wireless service provider managing the call tones content platform). The call tones content provider 30A or 30B generates ringback media for transmission to the calling party 100 in accordance with the profile.

In one possible variation, the profile includes (1) data identifying a first time period during which corporate ringback media is to be played to the calling party (such as between 9:00 am and 5:00 pm corporate call tone file "C1RBT1" is to be rendered, indicated in fields 306 and 308 of FIG. 3) and (2) data identifying a second time period in which non-corporate ringback media is to be played to the calling party (such as the period between 5:00 pm and 9:00 am, user-specified call tones pattern "RBT2" is to be rendered). The method further comprises the step of instructing a call tones content provider 30A or 30B (FIG. 4) as to ringback media to generate for transmission to the calling party 100 in accordance with the profile. In a variation, the method includes a step of transmitting at least a portion of the profile 26 for the wireless telephone 10 to a call tones content provider (such as for example the schedule portion and the identification of call tones to be rendered at different times of the day). The call tones content provider generates ringback media in accordance with the profile.

In one variation, the profile 26 is maintained by a provider of wireless communications services and managed by a call tones management platform 24. The call tones management platform is accessible to a corporate ringback media administrator over a computer network such as the Internet as shown in FIG. 1. The administrator can remotely configure the profile to define circumstances in which corporate ringback media is to be played to the calling party, e.g., using the interface features of FIG. 3.

In still another aspect, a method of facilitating rendering of both corporate and non-corporate ringback media to callers of a wireless telephone has been described. The method includes a step of providing a first interface (FIG. 3) to a call tone management platform 24 (FIG. 1) whereby a corporate call tones administrator may remotely configure a profile for a wireless telephone to identify circumstances in which a corporate ringback media is to be rendered to a caller to the wireless telephone. Typically, the wireless telephone is assigned to a user which is affiliated with the corporation, such as an employee of the corporation. The method further includes providing a second interface to the call tone management platform (see interfaces 21A, 21B and 21C of Figure, such as interactive voice response interface, Web interface, WAP interface or other), whereby the user may remotely configure the profile 26 to identify circumstances in which a non-corporate ringback media is to be rendered to a caller to the wireless telephone. For example, the call tones management platform 24 may include a Web interface 21B whereby the user can access their profile (302 in FIG. 4) and assign a particular call tone to be played to all callers between the hours of 5:00 pm and 10:00 pm.

The method further includes the step of providing logic executable in a computing platform with access to the profile (e.g., in the content management platform 24) for resolving conflicts, if any, between the circumstances identified by the administrator and circumstances identified by the user. For example, suppose that the user accesses their profile and specifies that call tones media file "Y" is to be played to all callers at any time, seven days a week, but a corporate call tones administrator assigned corporate call tones "X" to be played to all callers during business hours on weekdays. The logic resolves such conflicts so that the call tones platform and call tones generating engines such as those of third party providers are not faced with conflicting instructions. The logic could resolve such conflict in a variety of ways, for example may be programmed to resolve conflicts in favor of the call tones administrator. That is, in this example if a caller calls the telephone during business hours the profile is constructed such that the corporate call tone media "X" is to be rendered and at all other times the user-specified call tones media "Y" is to be rendered. Alternatively, the logic could specify that during business hours call tones media "X" is to be rendered to certain callers while call tones media "Y" is to be rendered to other callers during business hours.

In still another aspect, a method of facilitating rendering of both corporate and non-corporate ringback media to callers of a wireless telephone has been described. The method includes a step of providing an application generating a graphical user interface (example shown in FIG. 3) for interaction by a call tones administrator of a corporation. The application includes user interface features by which the administrator may identify circumstances in which a corporate ringback media is to be rendered to a caller to a wireless telephone. The wireless telephone is assigned to a user affiliated with the corporation, such as an employee or officer. The method further includes a step of uploading data representing the identified circumstances to a call tones management platform 24 and storing the data in a profile 26 for the wireless telephone. The method further includes a step of providing an interface (21, FIG. 1) to the call tone management platform whereby the user may remotely configure the profile to identify circumstances in which a non-corporate ringback media is to be rendered to a caller to the wireless telephone.

While a number of exemplary aspects and embodiments have been discussed above, those of skill in the art will recognize certain modifications, permutations, additions and sub-combinations thereof as being present in the disclosure. It is therefore intended that the following appended claims and claims hereafter introduced are interpreted to include all such modifications, permutations, additions and sub-combinations as are within their true spirit and scope.

We claim:

1. A method of facilitating rendering of both organizational and non-organizational ringback media to callers of a wireless telephone, comprising the steps of:
   a call tone management platform providing a first interface configured to receive from a call tones administrator of an organization a first configuration for a profile for a wireless telephone, wherein the first configuration identifies circumstances in which an organizational ringback media is to be rendered to a caller to the wireless telephone, wherein the wireless telephone is assigned to a user affiliated with the organization;
   providing a second interface to the call tone management platform, wherein the second interface is configured to receive from the user a second configuration for the profile, wherein the second configuration identifies circumstances in which a non-organizational ringback media is to be rendered to a caller to the wireless telephone; and
   providing logic executable in a computing platform with access to the profile for resolving conflicts, if any, between the circumstances identified by the administrator and the circumstances identified by the user.

2. The method of claim 1, wherein providing the first interface comprises an application generating a graphical user interface for interaction by the administrator.

3. The method of claim 2, wherein receiving the first configuration comprises receiving from the administrator via the graphical user interface an identification of a time during which a corporate call tone is to be rendered to a caller.

4. The method of claim 2, wherein receiving the first configuration comprises receiving from the administrator via the graphical user interface an identification of corporate ringback media to be rendered to a caller.

5. The method of claim 2, wherein receiving the first configuration comprises receiving from the administrator via the graphical user interface indications of (1) a plurality of wireless telephones each associated with a different user affiliated with the organization and (2) circumstances in which a corporate ringback media is to be rendered to a caller to the plurality of wireless telephones.

6. A method of facilitating rendering of both organizational and non-organizational ringback media to callers of a wireless telephone, comprising the steps of:
providing an application generating a graphical user interface for interaction by a call tones administrator of an organization, wherein the graphical user interface is configured to receive from the administrator an identification of circumstances in which an organizational ringback media is to be rendered to a caller to a wireless telephone, wherein the wireless telephone is assigned to a user affiliated with the organization;
uploading data representing the identified circumstances to a call tone management platform via a first interface provided by the call tone management platform and storing the data in a profile for the wireless telephone; and
the call tone management platform providing a second interface configured to receive from the user a configuration for the profile, wherein the configuration identifies circumstances in which a non-organizational ringback media is to be rendered to a caller to the wireless telephone.

7. The method of claim 6, wherein the call tones management platform includes a computing platform executing machine readable instructions, and wherein the instructions comprise logic which operates such that in the event of a conflict between the circumstances identified by the user and the circumstances identified by the administrator an error message is generated and presented on the interface to the user.

8. The method of claim 6, wherein the call tones management platform includes a computing platform executing machine readable instructions, and wherein the instructions comprise logic which operates such that in the event of a conflict between the circumstances identified by the user and the circumstances identified by the administrator the conflict is resolved in favor of the circumstances identified by the administrator.

9. The method of claim 8, wherein the method further comprises the step of forwarding at least a portion of the profile to a call tones content provider at the time the caller calls the wireless telephone.

10. The method of claim 8, wherein the method further comprises the step of instructing a call tones content provider as to ringback media to generate at the time the caller calls the wireless telephone.

11. The method of claim 6, wherein the call tones management platform includes a computing platform executing machine readable instructions, and wherein the instructions comprise logic which operates such that in the event that data is uploaded from the application which is in conflict with circumstances identified by the user the conflict is resolved in favor of the circumstances identified by the administrator.

12. The method of claim 11, wherein the method further comprises the step of forwarding at least a portion of the profile to a call tones content provider at the time the caller calls the wireless telephone.

* * * * *